June 14, 1938.  F. DÜRR  2,120,397
DUST ASPIRATOR
Filed Nov. 18, 1935
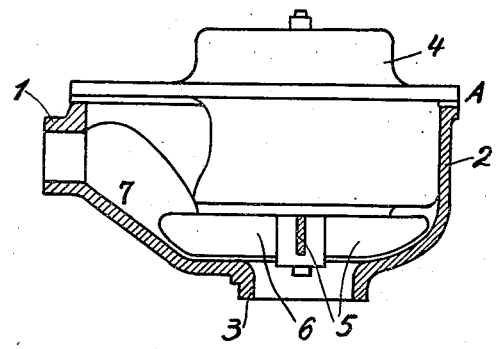
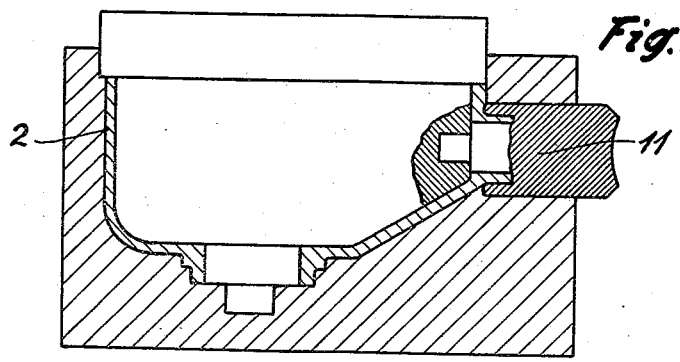
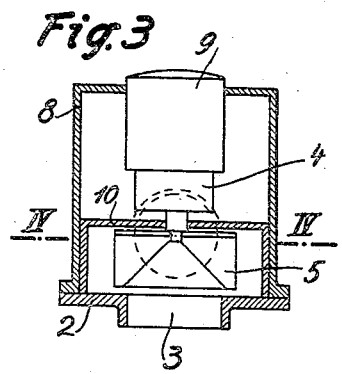 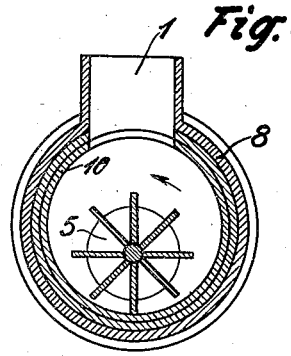
Inventor
Fritz Dürr.
By Chatwin & Company Attys.

Patented June 14, 1938

2,120,397

UNITED STATES PATENT OFFICE 2,120,397

DUST ASPIRATOR

Fritz Dürr, Berlin-Friedenau, Germany

Application November 18, 1935, Serial No. 50,375
In Great Britain September 24, 1934

1 Claim. (Cl. 230—133)

This invention relates to improvements in or relating to dust aspirators.

In dust aspirators, more particularly in dust aspirators operated by hand with feeble electric motors and specifically high forwarding capacity, it is important for the purpose of obtaining favourable conditions for the air current, that the channels be made of a material which can be polished so that the walls can be smoothed by grinding, polishing or a similar operation. In known casings of dust aspirators smooth walls can be obtained only by means of complicated pressing and polishing tools. This disadvantage is avoided by the present invention and the same time thermic and electrical advantages are obtained.

According to the invention the casing of the dust aspirator is open on one end and has a radially disposed air outlet for the air current, the casing being closed at its open end by a casing for the motor mounted on a different axis to that of the aspirator casing and the said aspirator casing being provided with an air inlet which is on the same axis as the motor casing. Further the aspirator casing is so shaped that the core can be removed without division so that the casing can be made by pressing, drawing, or the like. The aspirator casing may at the same time be made of insulating material. If desired, the aspirator casing may be electrically insulated only in respect to the motor casing. In this manner the otherwise troublesome back-discharges from the condenser, which is built in as a protective device, to the aspirator casing and consequently to the hand are avoided. The shape of the aspirator casing, which is open at one end, is such, that the core may be so constructed that all the surfaces which conduct the air current to the outlet can be adapted to one another. The aspirator casing may also be made of heat insulating material, thus avoiding the disadvantage of diminishing the efficiency of the apparatus owing to the air being heated and a smaller weight of air being forwarded through the apparatus.

Modes of execution of the invention are shown by way of example in the accompanying drawing in which:

Figure 1 is a side elevation, partly in section showing the aspirator casing, motor casing and accessory parts, Figure 2 is a cross section of the aspirator casing in the matrix, Figure 3 is a longitudinal section of a dust aspirator constructed according to the invention, and Figure 4 is a cross section along IV—IV of Figure 3.

The aspirator casing A comprises a pot 2, the open end of which is closed by a motor casing 4 mounted on a different axis. At the base of pot 2 an air inlet 3 is provided to which the aspirating nozzle may be attached. This inlet 3 is on the same axis as motor casing 4 and is situated in front of the blades 5 of the blower. A channel 7 is arranged in an oblique position sloping from the inlet to the outlet in order to adjust gradually the cross section of the pressure channels.

Pot 2 can readily be made by pressing metal such as aluminium or artificial materials suitable for pressing, such as bakelite, or some other material that can be moulded by subjecting it to pressure. The outlet 1 can be produced by inserting a core 11. Owing to the shape of pot 2 the subsequent grinding and polishing can readily be carried out in a simple manner.

The shape of pot 2 is such that it can be made of glass which is advantageous from the point of view of manufacture and also when examining the current phenomena for the purpose of demonstration. Pot 2 may be made of any electrically insulating and/or heat insulating material.

It is of course possible and within the scope of the invention as an alternative arrangement, to construct the motor casing as a pot with channels for the air current and to close this pot at its open end with a cover. Such an arrangement is shown in Figures 3 and 4. The motor 4 is placed eccentrically in a pot-shaped casing 8 by mounting it on a sleeve 9 which is fixed to the casing 8. Casing 8 has an outlet 1 and is closed by a cover 2, which is provided with an inlet 3. For the purpose of improving the conduction of the air a limited chamber for the ventilator may be formed with the aid of a hood 10 inserted in the open end of the aspirator casing.

The mounting of the motor in a large casing and consequently in a comparatively large space of air facilitates the abduction of heat from the motor.

What I do claim as my invention and desire to secure by Letters Patent, is:

A pot-shaped aspirator casing open at one side and having cylindrical extensions integral therewith for inlet and outlet of air, said extensions being disposed in the direction of the longitudinal and transverse axes respectively of the device and a motor casing having an upper hood and disposed within the aspirator casing, said aspirator casing being closed by the upper hood of the motor casing.

FRITZ DÜRR.